US012681224B2

(12) United States Patent
Yamaguchi

(10) Patent No.: US 12,681,224 B2
(45) Date of Patent: Jul. 14, 2026

(54) POLARIZING PLATE, HEAT FORMED BODY FORMED THEREOF, AND HEAT FORMED BODY MANUFACTURING METHOD

(71) Applicant: Kuraray Co., Ltd., Okayama (JP)

(72) Inventor: Mao Yamaguchi, Kurashiki (JP)

(73) Assignee: Kuraray Co., Ltd., Okayama (JP)

( * ) Notice: Subject to any disclaimer, the term of this patent is extended or adjusted under 35 U.S.C. 154(b) by 204 days.

(21) Appl. No.: 18/571,655

(22) PCT Filed: Jun. 28, 2022

(86) PCT No.: PCT/JP2022/025801
§ 371 (c)(1),
(2) Date: Dec. 18, 2023

(87) PCT Pub. No.: WO2023/277025
PCT Pub. Date: Jan. 5, 2023

(65) Prior Publication Data
US 2024/0361506 A1     Oct. 31, 2024

(30) Foreign Application Priority Data

Jun. 29, 2021    (JP) ................................. 2021-107357

(51) Int. Cl.
*G02B 5/30* (2006.01)
*G02B 1/08* (2006.01)
(52) U.S. Cl.
CPC ............. *G02B 5/3025* (2013.01); *G02B 1/08* (2013.01)

(58) Field of Classification Search
CPC ................................... G02B 5/30; G02B 1/08
(Continued)

(56) References Cited

U.S. PATENT DOCUMENTS

2012/0161345 A1* 6/2012 Greener ........... B29D 11/00798
                                                    264/1.34
2019/0084384 A1     3/2019 Iwakiri
(Continued)

FOREIGN PATENT DOCUMENTS

CN        107728247 A      2/2018
JP        2002236214 A  *  8/2002
(Continued)

OTHER PUBLICATIONS

Machine_English_translation_JP_2002236214_A; Sugino, Y.; et al.; Polarizing film and Polarizing Plate and Liquid Crystal Display Device which uses the same; Aug. 23, 2002; EPO; whole document (Year: 2025).*

(Continued)

*Primary Examiner* — Tahseen Khan
(74) *Attorney, Agent, or Firm* — Morgan, Lewis & Bockius LLP

(57)                    ABSTRACT
There is provided a polarizing plate comprising a polarizing film with a thickness of 20 μm or less, wherein the amount of a non-oriented amorphous part in the polarizing film is 55 to 70%. Here the amount of an oriented crystalline part in the polarizing film is preferably 10 to 15%. By thermoforming the polarizing plate, there can be provided a thermoformed article having sufficient polarization performance and free from cracks even with a large deformation amount during thermoforming.

20 Claims, 7 Drawing Sheets

(58) Field of Classification Search
USPC ........................................................ 428/174
See application file for complete search history.

(56)                          References Cited

U.S. PATENT DOCUMENTS

| | | |
|---|---|---|
| 2021/0032421 A1 | 2/2021 | Nishimura et al. |
| 2021/0213693 A1 | 7/2021 | Matsue et al. |

FOREIGN PATENT DOCUMENTS

| | | | |
|---|---|---|---|
| JP | 2004-130916 A | | 4/2004 |
| JP | 2007240907 A | * | 9/2007 |
| JP | 2011-085900 A | | 4/2011 |
| JP | 2018-028662 A | | 2/2018 |
| JP | 2019-051874 A | | 4/2019 |
| TW | 201936735 A | | 9/2019 |

| | | | |
|---|---|---|---|
| WO | 2015/020046 A1 | 2/2015 |
| WO | 2017/138551 A1 | 8/2017 |
| WO | 2019/189695 A1 | 10/2019 |
| WO | 2019/230884 A1 | 12/2019 |
| WO | 2020/255779 A1 | 12/2020 |

OTHER PUBLICATIONS

Machine_English_translation_JP_2007240907_A; Yaegaki, et al.; Polarizing Lens; Sep. 20, 2007; EPO; whole document (Year: 2025).*
International Search Report issued in the corresponding Application No. PCT/JP2022/025801, mailed Sep. 6, 2022.
Written Opinion of the International Search Authority issued in the corresponding Application No. PCT/JP2022/025801, mailed Sep. 6, 2022.

* cited by examiner

[FIG. 1]
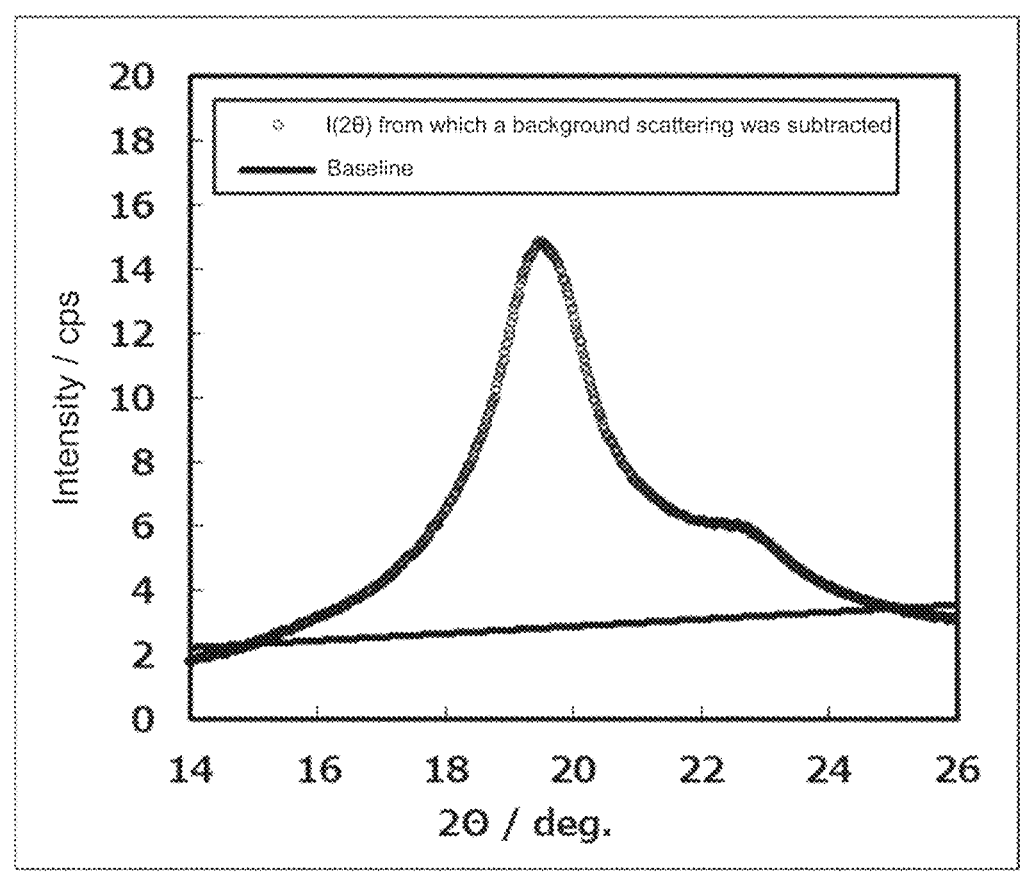

[FIG. 2]
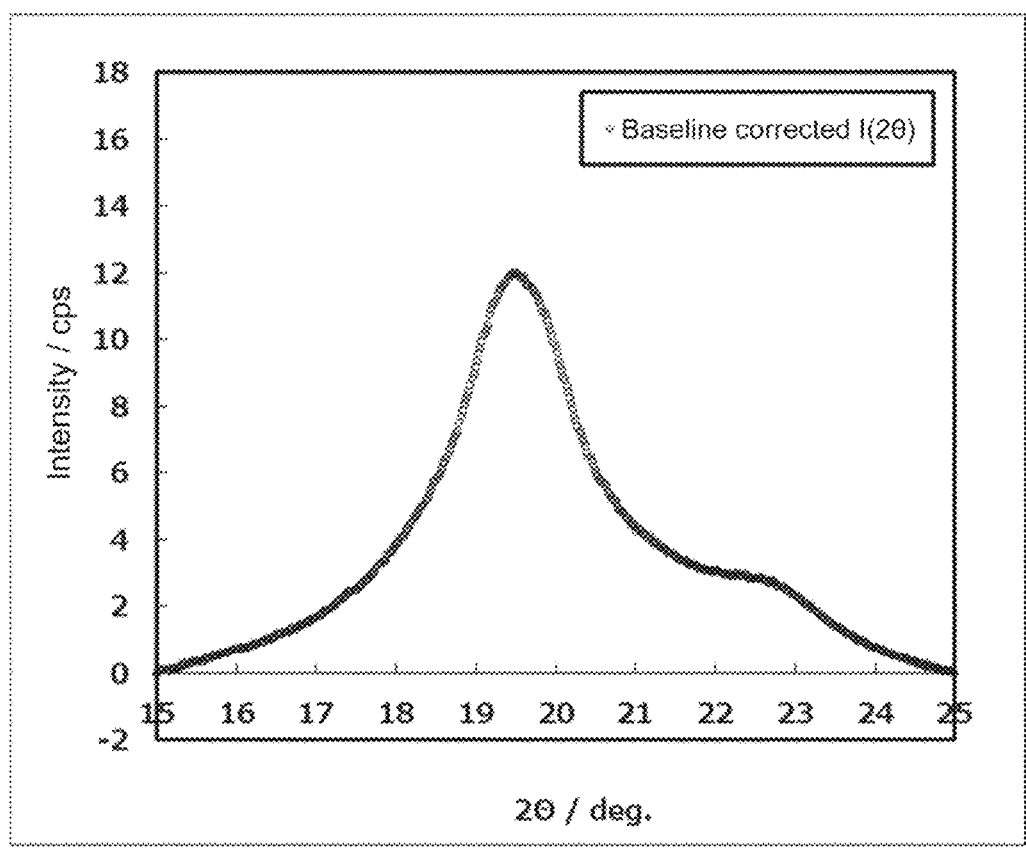

[FIG. 3]
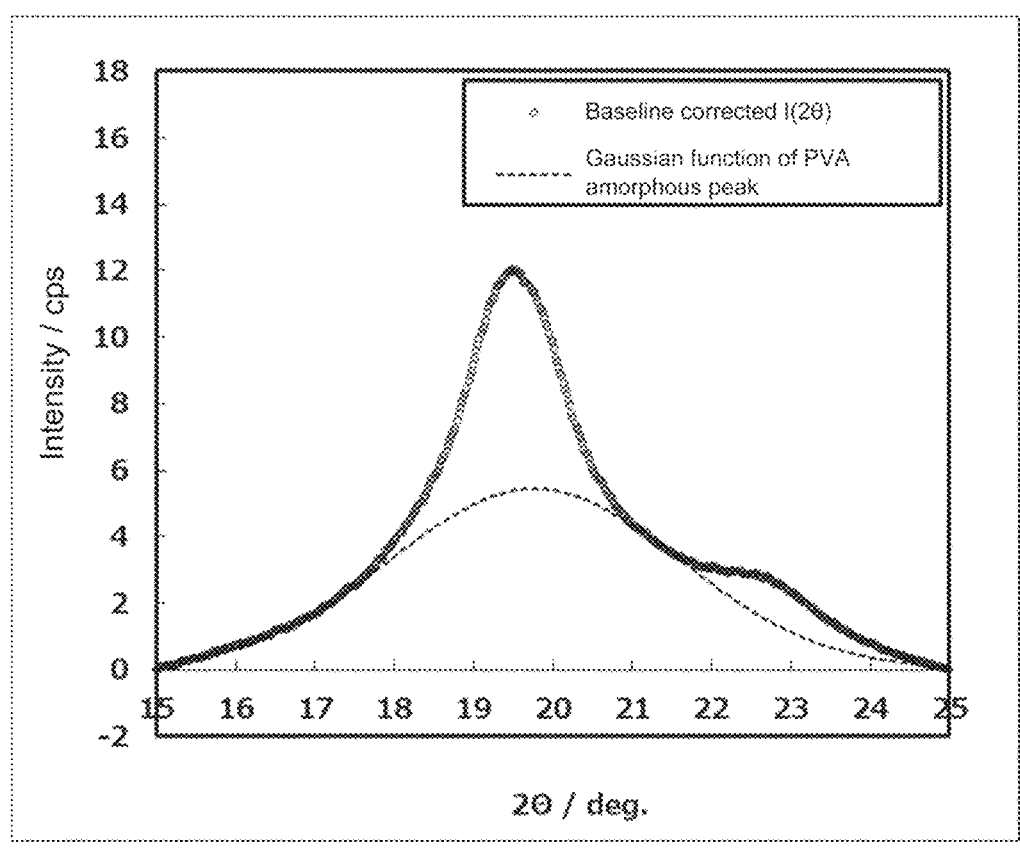

[FIG. 4]
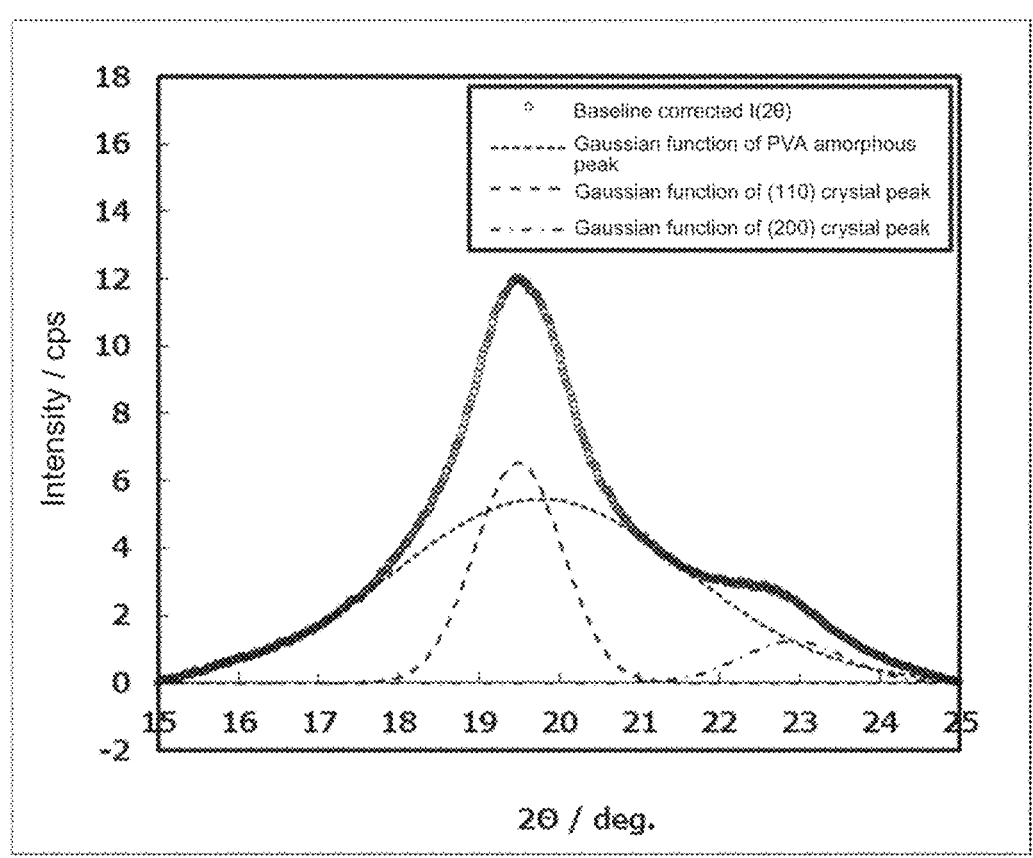

[FIG. 5]
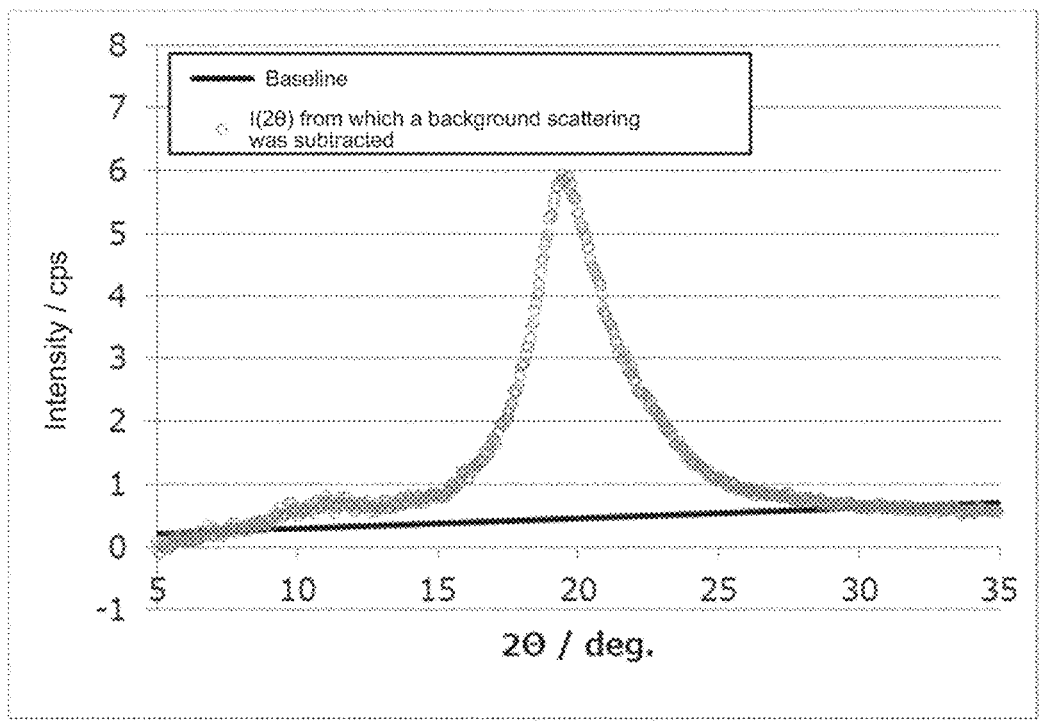
[FIG. 6]
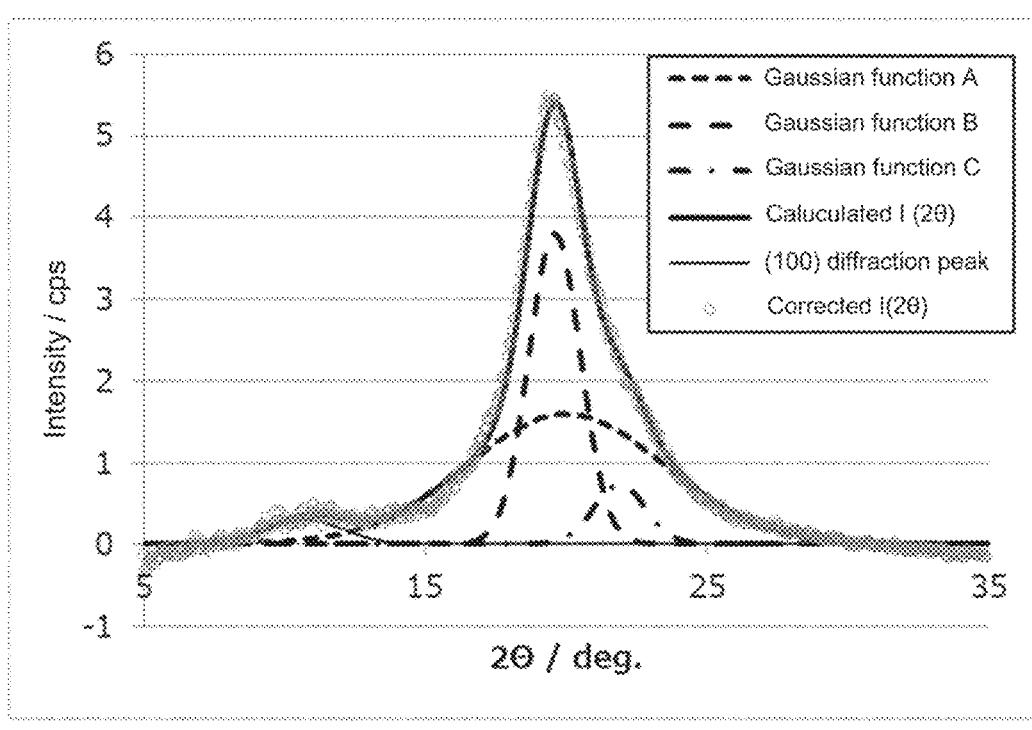

[FIG. 7]
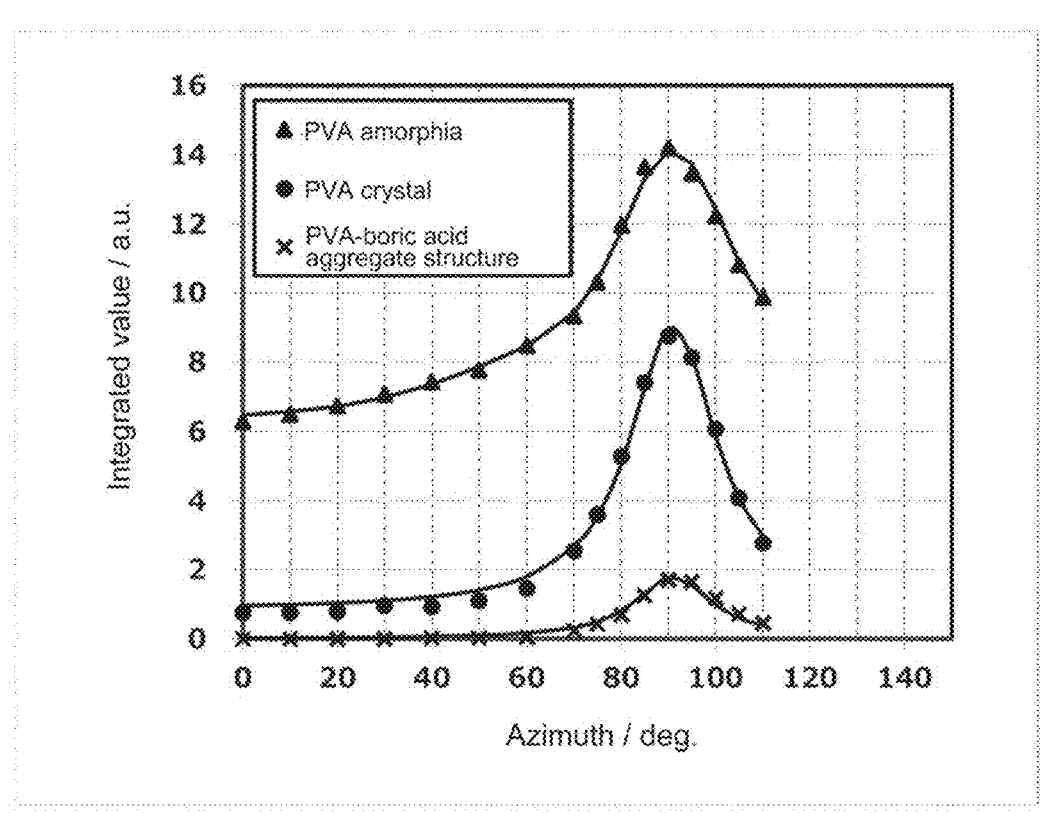

[FIG. 8]
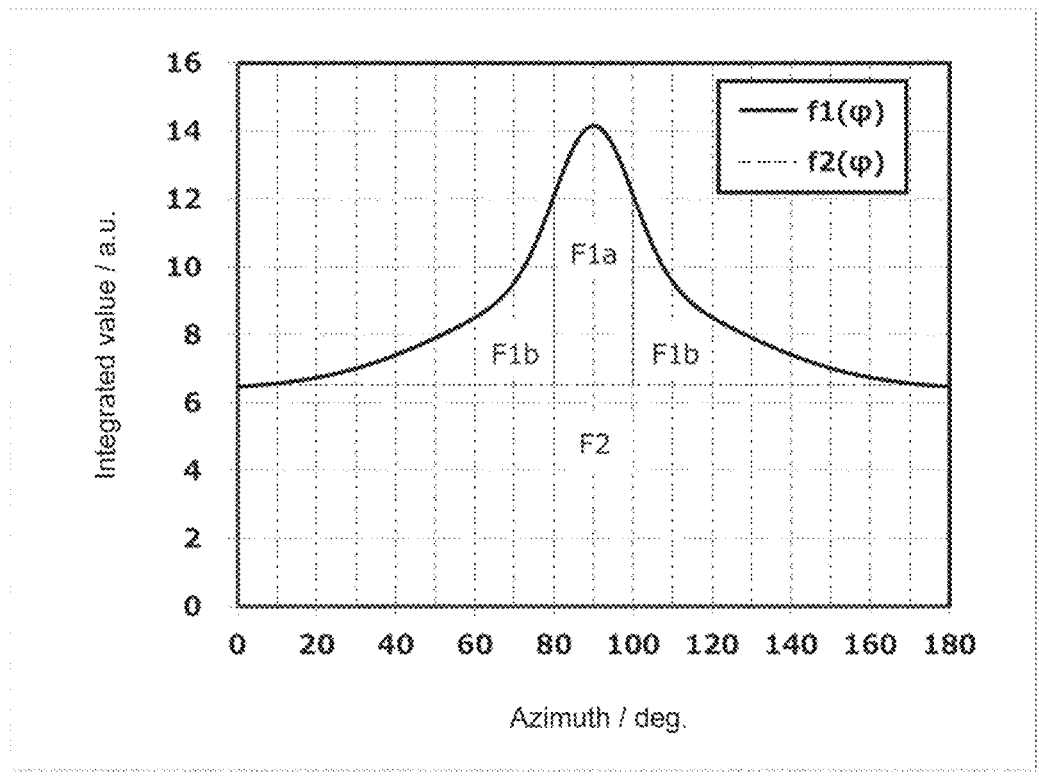
[FIG. 9]
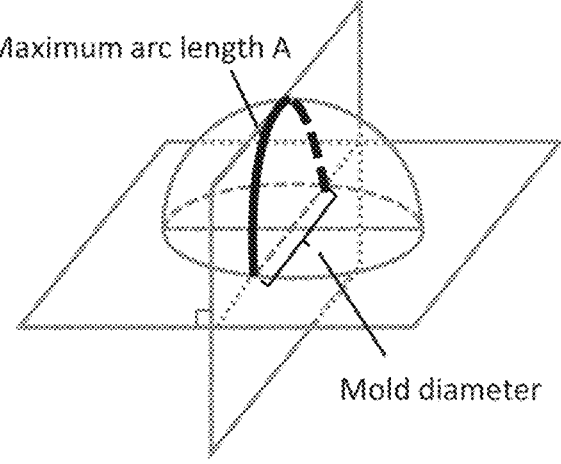

POLARIZING PLATE, HEAT FORMED BODY FORMED THEREOF, AND HEAT FORMED BODY MANUFACTURING METHOD

TECHNICAL FIELD

The present invention relates to a polarizing plate, a thermoformed article formed by thermoforming the same, and a method for producing a thermoformed article.

BACKGROUND ART

A polarizing film is mainly a matrix formed by uniaxially stretching a polyvinyl alcohol (hereinafter, "polyvinyl alcohol" is sometimes abbreviated as "PVA") film (an oriented stretched-film formed by uniaxial stretching) on which a dichroic dye such as an iodine dye (for example, $I_3^-$ or $I_5^-$) and a dichroic organic dye is adsorbed. Such a polarizing film is produced by uniaxially stretching a PVA film previously containing a dichroic dye; uniaxially stretching a PVA film while a dichroic dye is adsorbed; or uniaxially stretching a PVA film before adsorption of a dichroic dye. A polarizing plate produced by laminating a protective film such as a triacetyl cellulose (TAC) film, an acrylic film and a polyester film on one or both sides of the polarizing film obtained has light transmission and shielding function and is, along with a liquid crystal which varies polarization state of light, a basic component of a liquid crystal display (LCD).

Utilizing its light transmission and shielding function, a polarizing plate is used for optical applications such as sunglasses, goggles and eyeglasses. In these applications, a polarizing plate must be processed to have a shape along a lens surface such as a curved surface. These polarizing plates are generally formed by thermoforming.

Furthermore, recently introducing a polarizing plate to an instrument panel of an automobile as in-vehicle use has been investigated. It is pointed out that in a conventional instrument panel, outside light reflected on the instrument panel may be projected in a windshield, resulting in deterioration of the visibility of a driver. To solve the problem, there has been proposed that a polarizing plate is placed on an instrument panel of a vehicle, and a function of the polarizing plate transmitting and shielding light in a particular polarization direction is utilized to prevent outer light from being reflected on the instrument panel and from reflecting on the windshield (Patent Reference No. 1). In this application, the polarizing plate must be shaped such that it closely contacts the instrument panel, and therefore, the polarizing plate is required to be thermoformed in accordance with the shape of the instrument panel.

However, since a polarizing plate used for the above application is required to exhibit higher polarization performance, it is fully stretched during stretching a PVA film. Therefore, a resulting polarizing plate has an insufficient extension allowance in a stretching direction, so that deformation in a stretching direction during thermoforming may cause cracks in a direction vertical to the stretching direction.

In optical applications, for preventing cracks in a direction vertical to a stretching direction, it is known to use a highly stretchable polarizing film made of a PVA resin film comprising a halide and a modified PVA wherein a strain quantity when it is stretched with a load changing speed of 98.0 mN/min in an absorption axis direction is 10% or more; and a contraction factor in the absorption axis direction when it is heated at 85° C. for 120 min is 5% or less, but no descriptions for a thermoformed article have been disclosed (Patent Reference No. 2).

For preventing cracks in a direction vertical to a stretching direction in in-vehicle use, there has been proposed a method comprising swelling by moistening a raw material film, stretching the film in one direction to impart polarization property while it is shaped into the surface shape of an object member and laminated on the surface of the object member, then drying the raw material film and then forming a protective coating layer (Patent Reference No. 3). However, it is not easy to laminate a moisture-containing polarizing film on a curved surface or to uniformly apply a protective coating thereon. Furthermore, a protective coating layer cannot sufficiently ensure higher durability and strength needed for the in-vehicle use.

PRIOR ART REFERENCES

Patent References

Patent Reference No. 1: JP 2004-130916A
Patent Reference No. 2: WO 2020/255779
Patent Reference No. 3: JP 2019-51874A

SUMMARY OF THE INVENTION

Problems to be Solved by the Invention

Recently, there has been increased optical applications such as sunglasses excellent in design wherein a polarizing plate is thermoformed with a large deformation amount. Furthermore, in in-vehicle use, curved instrument panels with a larger deformation amount have been increased for improving designability. However, a conventional polarizing plate has a defect of cracks during thermoforming. Furthermore, since a polarizing plate has a part deformable in a direction vertical to a stretching direction thereof during thermoforming, the part in a thermoformed article exhibits poor polarization performance, so that it may not sufficiently exhibit a function of light shielding in an optical application such as sunglasses or the effects of reflection prevention in in-vehicle use. There has been, therefore, needed a polarizing plate which can achieve compatibility between polarization performance and thermoforming properties.

In other words, an objective of the present invention is to provide a polarizing plate having sufficient polarization performance and free from cracks even with a deformation amount during thermoforming; a thermoformed article produced by thermoforming the polarizing plate; and a method for producing the thermoformed article.

Means for Solving the Problems

To solve the above problems, we have made intense investigation and finally have achieved the present invention. Specifically, the present invention relates to the following [1] to [8].

[1] A polarizing plate comprising a polarizing film with a thickness of 20 μm or less, wherein the amount of a non-oriented amorphous part in the polarizing film is 55 to 70%.

[2] The polarizing plate as described in [1], wherein the amount of an oriented crystalline part in the polarizing film is 10 to 15%.

[3] A thermoformed article formed by thermoforming the polarizing plate as described in [1] or [2].

3                                                    4

[4] The thermoformed article as described in [3], having a maximum elongation coefficient of 35% or less.

[5] The thermoformed article as described in [3] or [4], wherein a crack rate is 0 to 40% when thermoforming is conducted using a mold which has a spherical concave having a curvature radius of 5.8 cm and a depth of 2.8 cm.

[6] The thermoformed article as described in any of [3] to [5], wherein a polarization degree is 80 to 99.7%.

[7] The thermoformed article as described in any of [3] to [6], wherein a single body transmittance is 20 to 40%.

[8] A method for producing a thermoformed article comprising thermoforming the polarizing plate as described in [1] or [2].

Effects of the Invention

By the use of a polarizing plate of the present invention, there can be provided a thermoformed article having sufficient polarization performance and free from cracks even with a deformation amount during thermoforming.

Furthermore, by employing a method for producing a thermoformed article of the present invention, there can be provided the above excellent thermoformed article.

BRIEF DESCRIPTION OF THE DRAWINGS

FIG. 1 is a figure in which a baseline is drawn in an X-ray profile.

FIG. 2 is a figure showing correction based on the baseline drawn in FIG. 1.

FIG. 3 shows fitting of amorphous part by Gaussian function.

FIG. 4 shows fitting of crystal part by Gaussian function.

FIG. 5 is a figure in which a baseline is drawn in an $I(2\theta)$ profile.

FIG. 6 shows the baseline corrected $I(2\theta)$ profile separated into "PVA amorphia" (Gaussian function A), "PVA crystal" (Gaussian function B), "PVA-boric acid aggregate structure" (Gaussian function C).

FIG. 7 shows plots of integrated intensities (A) of "PVA amorphia", "PVA crystal", "PVA-boric acid aggregate structure" obtained by the waveform separation analysis against an azimuth.

FIG. 8 shows an integrated intensity (A) separated into a distribution function of oriented components $(f1(\varphi))$ and a distribution function of non-oriented components $(f2(\varphi))$.

FIG. 9 illustrates a maximum arc length A and a mold diameter.

MODES FOR CARRYING OUT THE INVENTION

The present invention will be specifically described. Herein, the upper and the lower limits of a numerical range (a content of each component, a value calculated from each component, each physical property value and the like) can be appropriately combined. Herein, a numerical range "XX to YY" means "XX or more and YY or less". A PVA film refers to a non-stretched film deposited using a film-deposition stock liquid containing a PVA. A polarizing film means an uniaxially-stretched PVA film containing a dichroic dye.

[PVA Film]

In the present invention, a PVA for use can be a polyvinyl ester produced by polymerizing one or more vinyl esters such as vinyl acetate, vinyl formate, vinyl propionate, vinyl butyrate, vinyl pivalate, vinyl versatate, vinyl laurate, vinyl stearate, vinyl benzoate and isopropenyl acetate which is then saponified. Among these vinyl esters, preferred are compounds having an intramolecular vinyloxycarbonyl group in the light of easiness of PVA production, availability, a cost and the like, and more preferred is vinyl acetate.

The above polyvinyl ester is preferably produced using only one or more vinyl esters as a monomer, more preferably only one vinyl ester as a monomer, and without impairing the effects of the present invention, it can be a copolymer of one or more vinyl esters with another monomer copolymerizable therewith.

Examples of another monomer copolymerizable with the above vinyl ester include α-olefins having 2 to 30 carbon atoms such as ethylene, propylene, 1-butene and isobutene; (meth)acrylic acid or salts thereof; (meth)acrylic acid esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate and octadecyl (meth)acrylate; (meth)acrylamide; (meth)acrylamide derivatives such as N-methyl(meth)acrylamide, N-ethyl(meth)acrylamide, N,N-dimethyl(meth)acrylamide, diacetone(meth)acrylamide, (meth)acrylamide propanesulfonic acid or its salts, (meth)acrylamidepropyldimethylamine or salts thereof, N-methylol(meth)acrylamide or derivatives thereof; N-vinylamides such as N-vinylformamide, N-vinylacetamide and N-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; vinyl cyanides such as (meth)acrylonitrile; halogenated vinyls such as vinyl chloride, vinylidene chloride, vinyl fluoride and vinylidene fluoride; allyl compounds such as allyl acetate and allyl chloride; maleic acid or salts, esters or acid anhydrides thereof; itaconic acid or salts, esters or acid anhydrides thereof; vinylsilyl compounds such as vinyltrimethoxysilane; and unsaturated sulfonic acids or salts thereof. The above polyvinyl esters can have structural units derived from one or more of the other monomers described above.

A proportion of structural units derived from the above other monomers in the above polyvinyl ester is preferably 15 mol % or less, more preferably 10 mol % or less, further preferably 5 mol % or less based on the molar number of the total structural units constituting the polyvinyl ester.

A PVA which is not graft copolymerized can be preferably used, and as long as the effects of the present invention are not significantly impaired, a PVA can be modified by one or more graft-copolymerizable monomer. The graft copolymerization can be conducted on at least one of a polyvinyl ester and a PVA obtained by saponifying the polyvinyl ester. Examples of a graft-copolymerizable monomer include unsaturated carboxylic acid or derivatives thereof; unsaturated sulfonic acid or derivatives thereof; and an α-olefin having 2 to 30 carbon atoms. A proportion of structural units derived from a graft-copolymerizable monomer in the polyvinyl ester or the PVA is preferably 5 mol % or less based on the molar number of the total structural units constituting the polyvinyl ester or the PVA.

Some of hydroxy groups in the PVA can be crosslinked or not. Alternatively, some of hydroxy groups in the PVA can be reacted with an aldehyde compound such as acetaldehyde and butylaldehyde to form an acetal structure or can be not reacted with any of these compounds to form an acetal structure.

A polymerization degree of the PVA is preferably, but not limited to, 1,000 or more. With a polymerization degree of PVA being 1,000 or more, polarization performance of a polarizing film obtained can be further improved. An extremely higher polymerization degree of the PVA may result in increase in cost of PVA production and/or poor process passableness during film deposition. A polymerization degree of the PVA is more preferably within the range of 1,000 to 10,000, further preferably within the range of 1,500 to 8,000, particularly preferably within the range of 1,800 to 4,000.

A saponification degree of the PVA is preferably 95 mol % or more, more preferably 98 mol % or more, further preferably 99 mol % or more, particularly preferably 99.3 mol % or more in the light of improving durability of a polarizing film obtained.

There will be described a PVA film used for a polarizing plate of the present invention.

A PVA film can contain a plasticizer. With the PVA film containing a plasticizer, handleability and stretchability of the PVA film can be improved. A polyol is preferably used as a plasticizer. Specific examples include ethylene glycol, glycerol, propylene glycol, diethylene glycol, diglycerol, triethylene glycol, tetraethylene glycol and trimethylolpropane, and a PVA film can contain one or more of these plasticizers. Among these, glycerol is preferable because stretchability of the PVA film is further improved.

A content of a plasticizer in a PVA film is preferably 15 parts by mass or less, more preferably 10 parts by mass or less, further preferably 5 parts by mass or less based in 100 parts by mass of the PVA. With a content of a plasticizer in a PVA film being 15 parts by mass or less based on 100 parts by mass of the PVA, deterioration of handleability of the PVA film due to bleedout of the plasticizer to the surface of the PVA film can be prevented.

A crystallinity degree of a PVA contained in the PVA film can be controlled by adjusting the type and content of a plasticizer and/or a drying temperature during depositing a PVA film as described later.

There are no particular restrictions to a PVA film used for producing a polarizing plate of the present invention, and for producing a polarizing plate having sufficient polarization performance, a crystallinity degree of the PVA film is desirably 25% or more. Since a polarizing plate with less cracks during thermoforming can be obtained, a crystallinity degree of the PVA film is desirably 31% or less. Here, a crystallinity degree can be determined using a measurement method as described later.

A content of a PVA in the PVA film is preferably within the range of 50 to 100% by mass, more preferably within the range of 80 to 100% by mass, further preferably within the range of 85 to 100% by mass.

When a PVA film is produced using a film-deposition stock liquid containing a PVA, a film-deposition stock liquid preferably contains a surfactant since thickness unevenness of the film is inhibited and peeling of the PVA film from a metal roll or belt after film deposition is easier, resulting in improvement in film-deposition properties. There are no particular restrictions to the type of a surfactant film-deposition stock liquid and particularly of a surfactant contained in the PVA film, but in the light of peelability from a metal roll or belt, it is preferably an anionic surfactant or nonionic surfactant, particularly preferably a nonionic surfactant.

Suitable examples of an anionic surfactant include carboxylic acid types such as potassium laurate; sulfuric acid ester types such as octyl sulfate; and sulfonic acid types such as dodecyl benzenesulfonate.

Suitable examples of a nonionic surfactant include alkyl ether types such as polyoxyethylene oleyl ether; alkyl phenyl ether types such as polyoxyethyleneoctyl phenyl ether; alkyl ester types such as polyoxyethylene laurate; alkylamine types such as polyoxyethylene laurylamino ether; alkylamide types such as polyoxyethylene laurylamide; polypropylene glycol ether types such as polyoxyethylene polyoxypropylene ether; alkanolamide types such as lauric diethanolamide, oleic diethanolamide; and allyl phenyl ether types such as polyoxyalkylene allylphenyl ether.

These surfactants can be used alone or in combination of two or more.

When a film-deposition stock liquid contains a surfactant, a content of the surfactant in the film-deposition stock liquid, particularly a content of the surfactant in a PVA film is preferably within the range of 0.01 to 0.5 parts by mass, more preferably within the range of 0.02 to 0.3 parts by mass based on 100 parts by mass of a PVA contained in the film-deposition stock liquid or the PVA film. With a content of a surfactant being 0.01 parts by mass or more based on 100 parts by mass of the PVA, defects can be inhibited and peelability from a metal roll can be improved. With a content of a surfactant being 0.5 parts by mass or less based on 100 parts by mass of the PVA, blocking of a film due to bleedout of the surfactant can be prevented, resulting in stable handleability.

A PVA film can be made of a PVA alone or can further contain a plasticizer and a surfactant, and further contain, if necessary, other components such as an antioxidant, an antifreezing agent, a pH adjuster, a masking agent, a discoloration inhibitor and an oil agent.

Examples of an liquid medium used for preparing a film-deposition stock liquid include water, dimethyl sulfoxide, dimethylformamide, dimethylacetamide, N-methylpyrrolidone, ethylene glycol, glycerol, propylene glycol, diethylene glycol, triethylene glycol, tetraethylene glycol, trimethylolpropane, ethylenediamine and diethylenetriamine, and one or more of these can be used. Among these, water is preferable in the light of smaller load imposed on environment and recovering properties.

A volatile fraction of a film-deposition stock liquid (a content ratio of volatile components such as a liquid medium removed by volatilization or evaporation during film deposition in the film-deposition stock liquid), which varies depending on a film-deposition method, film-deposition conditions and the like, is preferably within the range of 50 to 95% by mass, more preferably within the range of 55 to 90% by mass, further preferably within the range of 60 to 85% by mass. With a volatile fraction of the film-deposition stock liquid being 50% by mass or more, viscosity of the film-deposition stock liquid does not excessively increase; filtration and defoaming during preparing the film-deposition stock liquid smoothly proceed; and a PVA film with less foreign matters or defects can be easily produced. With a volatile fraction of the film-deposition stock liquid being 95% by mass or less, a concentration of the film-deposition stock liquid is not excessively reduced, so that a PVA film can be industrially easily produced.

Examples of a film-deposition method when a PVA film is deposited using the above film-deposition stock liquid include cast deposition, extrusion deposition, wet film-deposition and gel deposition, preferably casting deposition and extrusion deposition. These film-deposition methods can be used alone or in combination of two or more. Among these film-deposition methods, casting deposition and extrusion deposition are more preferable since a PVA film with a uniform thickness and width having good physical properties can be obtained. The PVA film can be, if necessary, subjected to drying or heating using a dry roll or heating roll.

There are no particular restrictions to a method for producing a PVA film, and preferred is a production method whereby a thickness and a width of the film are more uniform after film deposition. For example, the PVA film can be produced using the above PVA constituting the PVA film, and if necessary, a film-deposition stock liquid containing one or more of the plasticizer, the surfactant and the other components. When the film-deposition stock liquid contains one or more of the plasticizer, the surfactant and the other components, it is preferable that these components are homogeneously mixed.

A temperature during drying is, but not limited to, preferably within the range of 40 to 120° C., more preferably within the range of 60 to 105° C., further preferably within the range of 80 to 95° C. in the light of controlling a crystallinity degree of a PVA contained in a PVA film within the above range.

For improving productivity in a production process for a polarizing film, a PVA film is preferably heat-treated. A temperature of the heat-treatment is preferably 90° C. or higher, more preferably 100° C. or higher, further preferably 110° C. or higher. In the light of improving stretchability of a PVA film obtained, a surface temperature of a heat-treatment roll is preferably 150° C. or lower, more preferably 140° C. or lower, further preferably 130° C. or lower.

A thickness of a PVA film is, but not limited to, preferably 60 μm or less, more preferably 45 μm or less, further preferably 30 μm or less. With a thickness of the PVA film being 60 μm or less, handleability, stretchability and the like can be improved. Since a polarizing film can be smoothly manufactured, a thickness of the PVA film is preferably 1 μm or more, more preferably 3 μm or more.

There are no particular restrictions to a shape of a PVA film, but it is preferably a long film because a polarizing film can be continuously produced with high productivity. There are no particular restrictions to a length of the long film, and it can be appropriately determined, depending on an application of a polarizing film produced, and for example, it can be within the range of 5 to 20,000 m. There are no particular restrictions to a width of the long film; for example, it can be 50 cm or more, but since a wider polarizing film has been recently needed, it is preferably 1 m or more, more preferably 2 m or more, further preferably 4 m or more. There are no particular restrictions to the upper limit of a width of a long film, but if a width is too large, uniform stretching tends to be difficult in producing a polarizing film using an apparatus in practical use, and therefore, a width of the PVA film is preferably 7 m or less.

[Polarizing Film]

A polarizing film using a PVA film will be described.

Cracks formed during thermoforming of a polarizing plate receive intense influence of a solid structure of the polarizing film.

A solid structure of a polarizing film can be analyzed by wide-angle X-ray diffractometry (WAXD), and can be divided into 3 components, that is, "PVA crystal", "PVA amorphia", and "PVA-boric acid aggregate structure" for quantitative determination. Herein, "PVA crystal" refers to a crystalline PVA chain, and "PVA amorphia" refers to a non-crystalline amorphous PVA chain. Furthermore, "PVA-boric acid aggregate structure" refers to a structure derived from a peak which is known to appear in an X-ray profile when boric acid is added to a PVA, and the peak is believed to be a diffraction signal from a structure formed by inter-action between the PVA and boric acid.

Each of these 3 components can be divided into 3 components of a non-oriented component, a low oriented component and a high oriented component. Thus, solid structure can be divided into 9 components in total. Thus, a fraction (%) of each component can be determined based on 100% of the total 9 components. Specific WAXD measurement and analytical method thereof will be detailed later.

A non-oriented amorphia means a "PVA amorphous" non-oriented component in a polarizing film, that is, a structure in which a PVA chain is not oriented even after a stretching process during producing a polarizing film. Therefore, even if force is applied in a stretching direction of a polarizing film during thermoforming a polarizing plate, it seems that there is room for further stretching for orientation. That is, it is supposed that the larger the amount of a non-oriented amorphia in a polarizing film contained in a polarizing plate, the larger a stretching allowance in a stretching direction of the polarizing film and the more the polarizing plate is thermoformed.

An oriented crystal means an oriented component of a "PVA crystal" in a polarizing film (the total of a low oriented component and a high oriented component) and is a structure in which a PVA chain in crystalline state after a stretching process in manufacturing a polarizing film is oriented. Therefore, it is supposed that when force is applied in a stretching direction of a polarizing film during thermoforming a polarizing plate, stress is applied to an oriented crystalline part, which may be then a crack origin. That is, it is supposed that the more the amount of an oriented crystal in a polarizing film contained in a polarizing plate is, more frequently cracks occur during thermoforming a polarizing plate.

A polarizing film generally has a three-layer structure of skin layers around both surfaces having a relatively higher orientation degree and a core layer around the center having a relatively lower orientation degree. It is supposed that cracks occurring during thermoforming a polarizing plate are generated from the skin layers of the polarizing film with a high orientation degree to which stress concentrates, as an origin. When the polarizing film is thin, a difference between the skin layer and the core layer before stretching is reduced, so that stress concentration to the skin layer during stretching is considered difficult to occur. It is, therefore, supposed that the amount of a deformable solid structure present in the whole polarizing film rather than the surface layer of the polarizing film, that is, the amount of a non-oriented amorphia, greatly affects tendency to crack occurrence during thermoforming the polarizing plate.

The amount of a non-oriented amorphia of a polarizing film contained in a polarizing plate of the present invention is 55 to 70%. If the amount of a non-oriented amorphia is more than 70%, polarization performance tends to be insufficient. The amount of a non-oriented amorphia is preferably 69% or less, more preferably 68% or less. If the amount of a non-oriented amorphia is less than 55%, cracks tend to occur during thermoforming a polarizing plate. The amount of a non-oriented amorphia is preferably 56% or more, more preferably 57% or more.

A thickness of a polarizing film contained in a polarizing plate of the present invention is 20 μm or less. Although details are not clear, with a thickness of the polarizing film being 20 μm or less, the effects of the present invention are strongly exhibited. A thickness of the polarizing film is preferably 17 μm or less, more preferably 14 μm or less, further preferably 12 μm or less. There are no particular restrictions to the lower limit of a thickness of the polarizing film, but if the thickness is too small, rupture strength of the polarizing film is so lowered that cracks tend to occur during thermoforming the polarizing plate. Therefore, a thickness of the polarizing film is preferably 1 μm or more, more preferably 3 μm or more, further preferably 5 μm or more.

The amount of an oriented crystal in a polarizing film contained in a polarizing plate of the present invention is preferably 10 to 15%. With the amount of an oriented crystal in the polarizing film being 10% or more, a polarizing film is fully stretched, so that polarization performance of the polarizing film, the polarizing plate or the thermoformed article can be improved. With the amount of an oriented crystal in the polarizing film being 15% or less, cracks occurring during thermoforming the polarizing plate can be reduced. The amount of an oriented crystal in the polarizing film is preferably 10% or more, more preferably 11% or more, and preferably 15% or less, more preferably 13% or less.

Each of the amounts of the non-oriented amorphia and the oriented crystal in the polarizing film can be controlled by adjusting one or more of various factors such as a polymerization degree and a saponification degree of a PVA, the type and a content of a plasticizer, a drying temperature during depositing a PVA film, a content of boric acid in the polarizing film, and a stretching temperature and a stretch ratio in a stretching process during forming a polarizing film described later.

In the present invention, a polarizing film preferably contains a boron compound. The boron compound allows for forming a crosslinked structure, resulting in improved durability of the polarizing film under a humid and hot environment. Examples of a boron compound include boric acid and boric acid salts such as borax, and these boron compounds can be used alone or in combination of two or more. Among these boron compounds, boric acid is preferable in the light of improving durability of a polarizing film under a humid and hot environment.

A content of boric acid in the polarizing film is preferably within the range of 5 to 30% by mass based on the weight of the polarizing film. If it is less than 5% by mass, durability may be significantly deteriorated under a humid and hot environment. A content of boric acid in the polarizing film is more preferably 10% by mass or more. If it is more than 30% by mass, a number of cracks may occur during thermoforming the polarizing plate. A content of boric acid in the polarizing film is more preferably 25% by mass or less.

[Production Method for a Polarizing Film]

There are no particular restrictions to a method for producing a polarizing film contained in a polarizing plate of the present invention, and any known method can be employed, but suitable methods will be illustrated below.

A preferable method for producing a polarizing film of the present invention is a method comprising a process of preliminarily swelling a PVA film (hereinafter, sometimes referred to as "swelling process"), then a process of staining the PVA film (hereinafter, sometimes referred to as "staining process"), and a process of stretching the PVA film (hereinafter, sometimes referred to as "stretching process") and a process of crosslinking the PVA film using a cross-linker (hereinafter, sometimes referred to as "crosslinking process"). There are no particular restrictions to the order of the staining process, the stretching process and the crosslinking process, but, it is preferable that after the swelling process, the staining process, the crosslinking process and the stretching process are conducted in sequence.

Each process will be described in detail.

Swelling in the swelling process can be conducted by immersing the PVA film in water. A temperature of water during immersion in water is preferably within the range of 20 to 55° C., more preferably within the range of 25 to 52° C., further preferably within the range of 30 to 50° C. A time of immersion in water is, for example, preferably within the range of 0.1 to 5 min, more preferably within the range of 0.5 to 3 min. Here, water used in immersion in water is not limited to pure water and can be an aqueous solution in which various components are dissolved, or a mixture of water with a water-soluble medium.

Staining in the staining process can be conducted at any step of before stretching, during stretching and after stretching, preferably before stretching. Staining can be conducted by immersing the PVA film in a solution containing a dichroic dye (dyeing bath). The dichroic dye can be an iodine dye, a dichroic organic dye or the like.

Examples of an iodine dye include $I_3^-$ and $I_5^-$. These iodine dyes can be prepared by, for example, contacting iodine ($I_2$) with potassium iodide. Therefore, using a solution containing iodine-potassium iodide (particularly, an aqueous solution) as a dyeing bath, staining is conducted by immersing a PVA film in the bath.

Examples of a dichroic organic dye include Direct Black 17, 19, 154; Direct Brown 44, 106, 195, 210, 223; Direct Red 2, 23, 28, 31, 37, 39, 79, 81, 240, 242, 247; Direct Blue 1, 15, 22, 78, 90, 98, 151, 168, 202, 236, 249, 270; Direct Violet 9, 12, 51, 98; Direct Green 1, 85; Direct Yellow 8, 12, 44, 86, 87; Direct Orange 26, 39, 106, 107. These can be used in combination of two or more, and there are no particular restrictions to a blending ratio thereof, which can be appropriately determined. Therefore, by combining the dichroic organic dyes, a hue of the polarizing film can be made neutral gray.

A concentration of a dichroic dye in a dyeing bath can be appropriately determined depending on the type of a dichroic dye used and the like; for example, a concentration of a dichroic organic dye is preferably within the range of 0.001 to 0.3% by mass. Furthermore, a temperature of a dyeing bath is preferably within the range of 20 to 55° C., more preferably within the range of 30 to 50° C.

Crosslinking in the crosslinking process is immersion of a PVA film in an aqueous solution containing a cross-linker (crosslinking bath). By crosslinking, a crosslinking structure is introduced into the PVA film, and thus when it is subjected to wet stretching at a relatively higher temperature, elution of a PVA into water can be effectively prevented. In this light, it is preferable to conduct crosslinking after staining. A cross-linker can be one or two or more of boron compounds such as boric acid and boric acid salts including borax. A concentration of a cross-linker in the crosslinking bath is preferably within the range of 1 to 15% by mass, more preferably within the range of 1.5 to 7% by mass. The crosslinking bath can contain an aid such as potassium iodide. A temperature of the crosslinking bath is preferably within the range of 20 to 50° C., more preferably within the range of 25 to 45° C.

Stretching in the stretching process can be conducted by wet stretching or dry stretching. In the wet stretching, uniaxial stretching can be conducted in an aqueous solution containing boric acid, or uniaxial stretching can be conducted in the above swelling bath or a dyeing bath, or a fixing bath as described later. In dry stretching, uniaxial stretching can be conducted using a PVA film after water absorption under the atmosphere. Among these, preferred is wet stretching, and more preferred is wet stretching in which uniaxial stretching is conducted in an aqueous solution containing boric acid.

A concentration of boric acid in an aqueous solution of boric acid in wet stretching is preferably within the range of 0.5 to 6.0% by mass, more preferably within the range of 1.0 to 5.0% by mass, particularly preferably within the range of 1.5 to 4.0% by mass. The aqueous solution of boric acid can contain potassium iodide, whose concentration is preferably within the range of 0.01 to 10% by mass.

A stretching temperature during stretching is preferably within the range of 55 to 65° C.

A stretching ratio in stretching is preferably 4 or more, more preferably 5 or more, particularly preferably 6 or more in the light of polarization performance of a polarizing film obtained. There are no particular restrictions to the upper limit of a stretching ratio, but preferably, it is 8 or less.

In manufacturing a polarizing film, a PVA film can be appropriately washed (washing) between the above processes, but washing is preferably conducted before a drying process described later in the light of firmer adsorption of a dichroic dye to the PVA film. A washing bath for washing can be an aqueous solution containing one or more boron compounds such as boric acid and borax. If necessary, the washing bath can contain an iodine compound, a metal compound or the like. A concentration of the boron compound in the washing bath is preferably within the range of 1 to 15% by mass. When the washing bath contains potassium iodide as an iodine compound, its concentration is preferably within the range of 0.01 to 10% by mass. A temperature of the washing bath is preferably within the range of 15 to 60° C., more preferably within the range of 20 to 40° C.

Although not being necessarily limited, it is preferable that in the method for producing a polarizing film, the polarizing film after stretching is heat-dried by a drying process. A temperature of drying in the drying process is preferably within the range of 30 to 150° C., more preferably within the range of 50 to 130° C.

In the method for producing a polarizing film, one of the above processes can be conducted multiple times. Alternatively, a plurality of processes can be simultaneously conducted in one step.

[Polarizing Plate]

A polarizing plate of the present invention can be obtained by laminating a protective film on both or one side of the polarizing film. Existence of the polarizing film allows for a polarizing plate which achieves both polarization performance and thermoforming properties. A protective film can be a film which is optically transparent and has mechanical strength; specific examples include a triacetyl cellulose (TAC) film, an acetic acid-cellulose acetate (CAB) film, an acrylic film, a polyester film and a cyclic olefin (COP) film. Examples of an adhesive for lamination include a PVA adhesive, an urethane adhesive or an ultraviolet cure adhesive. Furthermore, a mordant for lamination can be used. A typical mordant is an acrylic mordant.

A polarization degree of a polarizing plate of the present invention is preferably 85% or more. If a polarization degree is less than 85%, sufficient polarization performance cannot be achieved, leading to deteriorated light shielding function. A polarization degree of a polarizing plate is more preferably 88% or more, further preferably 90% or more.

There are no particular restrictions to a single body transmittance of a polarizing plate of the present invention, but for sunglasses, if a single body transmittance of a polarizing plate is less than 20%, a visual field is so darkened that safety may be lowered. For in-vehicle use, if a single body transmittance of the polarizing plate is less than 20%, color of an instrument panel is so dark that interior color of the instrument panel becomes hard to view, leading to deterioration in the design quality. For these reasons, a single body transmittance of the polarizing plate is preferably 20% or more, more preferably 25% or more. There are no particular restrictions to the upper limit of a single body transmittance of the polarizing plate, but if a polarization degree is too low, sufficient polarization performance may not be achieved. A single body transmittance of the polarizing plate is preferably 38% or less, more preferably 35% or less. A method for measuring a single body transmittance is as described later.

There are no particular restrictions to a method for laminating a protective film on both or one side of the polarizing film, and a protective film can be laminated by any known method, but a method comprising continuously laminating a protective film on the polarizing film in the above lamination method is preferable in the light of production efficiency.

A polarizing plate thus obtained exhibits sufficient polarization performance and is resistant to cracking even during thermoforming. Therefore, it can be suitably used as sunglasses and a polarizing plate having an instrument panel shape.

[Thermoformed Article]

A thermoformed article of the present invention can be obtained by thermoforming the above polarizing plate.

A maximum elongation coefficient of the thermoformed article of the present invention is, but not limited to, preferably 35% or less, more preferably 30% or less. With a maximum elongation coefficient of the thermoformed article being 35% or less, reduction of a polarization degree of the thermoformed article due to deformation in a direction vertical to a stretching direction of the polarizing film contained in the thermoformed article can be prevented, resulting in sufficient polarization performance being achieved. Here, a maximum elongation coefficient of the thermoformed article refers to an elongation ratio of an arc length of the cross-section after thermoforming to the arc length after thermoforming at a position where an arc length of the cross-section is maximum, when the thermoformed article is cut on a plane vertical to the film surface.

There are no particular restrictions to a crack rate of the thermoformed article of the present invention, but it is preferable that a crack rate is 0 to 40% when thermoforming is conducted using a mold which has a spherical concave having a curvature radius of 5.8 cm and a depth of 2.8 cm. With the crack rate being 0 to 40%, cracks are hardly generated during thermoforming, and the article is suitable for in-vehicle use such as an instrument panel. The crack rate is more preferably 0 to 30%, further preferably 0 to 20%.

A polarization degree of the thermoformed article of the present invention is, but not limited to, preferably 80 to 99.7%. With a polarization degree of the thermoformed article being 80% or more, polarization performance of the thermoformed article is fully exhibited and light shielding function can be maintained. With a polarization degree of the thermoformed article being 99.7% or less, cracks generated during producing the thermoformed article can be reduced. A polarization degree of the thermoformed article is preferably 80% or more, more preferably 86% or more, further preferably 91% or more. A method for determining a polarization degree of the thermoformed article is as described later.

A single body transmittance of the thermoformed article of the present invention is, but not limited to, preferably 20 to 40%. With a single body transmittance of the thermoformed article being 20% or more, when the thermoformed article is used for sunglasses, a visual field is not so darkened and thus safety can be maintained. Furthermore, with a single body transmittance of the thermoformed article being 20% or more, for in-vehicle use, color of an instrument panel is prevented from darkening and thus interior color of the instrument panel becomes easy to view, and the design quality can be maintained. With a single body transmittance of the thermoformed article being 40% or less, sufficient polarization performance can be exhibited while a polarization degree of the thermoformed article is maintained. A single body transmittance of the thermoformed article is preferably 20% or more, more preferably 25% or more, more preferably 35% or less, further preferably 30% or less. A method for determining a single body transmittance of the thermoformed article is as described later.

A thickness of the thinnest part of the thermoformed article of the present invention is, but not limited to, preferably within the range of 1 to 200 μm. If the thickness is less than 1 μm, handleability is poor and continuous production cannot be conducted. Therefore, it is more suitably 3 μm or more. If the thickness is more than 200 μm, shrinkage of the thermoformed article may be significant, and therefore, it is 180 μm or less.

The thermoformed article thus obtained has sufficient polarization performance and cracks are hardly generated even when a deformation amount is large. Therefore, it is suitably used for sunglasses excellent in design and a polarizing plate having an instrument panel shape.

[Method for Producing a Thermoformed Article]

A method for producing a thermoformed article of the present invention will be described. By employing a method for producing a thermoformed article of the present invention, a thermoformed article of the present invention can be efficiently produced.

In a method for producing a thermoformed article of the present invention, there are no particular restrictions to a thermoforming style, and a polarizing plate can be thermoformed by, for example, heat vacuum forming, heating/pressure forming, heat press molding or the like, to give a thermoformed article.

A method for producing a thermoformed article of the present invention is a production method wherein a polarizing plate prepared by laminating a protective film on a polarizing film is thermoformed. By thermoforming a polarizing plate after a drying process, problems such as defective durability due to excessive water in a thermoformed article or shape change over time can be prevented. If drying is conducted after thermoforming, a thermoformed article shrinks during drying, so that cracks may be generated or a shape of the thermoformed article may be changed.

In the method for producing a thermoformed article of the present invention, there are no particular restrictions to a polarizing plate used, but in the light of increasing a success rate of thermoforming, it is preferable to use a polarizing plate of the present invention.

A thermoformed article produced employing a method for producing a thermoformed article of the present invention exhibits sufficient polarization performance and gives an article in which cracks are hardly generated even with a large deformation amount. Therefore, it is suitably used for sunglasses and an instrument panel excellent in design.

EXAMPLES

The present invention will be more specifically described with reference to Examples, but the present invention is not limited by these examples in any way.

Each evaluation method employed in Examples and Comparative Examples below will be described below.

[Calculation of a Crystallinity Degree] (Determination of a Wide-Angle X-Ray Diffraction (WAXD) of a PVA Film)

Determination of a wide-angle X-ray diffraction (Wide Angle X-ray Diffraction: WAXD) was conducted using D8 Discover from BrukerAXS. An incident X-ray wavelength was 0.154 nm (Cu target). A detector used was VANTEC-500 rare gas-filled micro-gap position sensitive two-dimensional detector, in which a camera distance (a distance between a sample and a detector) was set to 170 mm. A filament current of an X-ray generating apparatus was 1 mA, and a voltage was 50 kV, and a collimator diameter was 0.5 mm.

A PVA film obtained in each of Examples and Comparative Examples was cut into a rectangle with a short side of 5 mm and a long side of 20 mm. Here, a long side direction coincided with a longitudinal direction of the PVA film. A plurality of cut PVA films were stacked and adhered to a sample holder for fixing. It was confirmed in advance that a PVA-film signal is sufficiently stronger than background scattering, electric noise of a detector or the like.

A sample holder was mounted on a stage of an X-ray apparatus such that a longitudinal direction coincided with an X-axis direction of D8 Discover. Here, a normal line to the surface of the PVA film coincided with an X-ray incident direction. The X-, the Y- and the Z-axes were adjusted such that X-ray was to be irradiated to the PVA from the above incident direction.

WAXD measurement was conducted under the following conditions. For a sample, an ω axis (an axis which is set such that an angle made with a normal line to the surface of the PVA film and an X-ray incident direction is ω; generally frequently referred to as "θ axis") was set to 11°, a 2θ axis which is a detector position (an axis which is set such that an angle made with a normal line to the surface of the detector and an incident X-ray direction is 2θ) was set to 22°, and a ψ axis corresponding to rotation within the PVA film surface was set to 90° or 0°. A ψ axis coincides with an azimuth direction in the surface of the PVA film. When a stretching direction of the PVA film is a meridian direction and a direction vertical thereto in plane is an equatorial direction, with a ψ axis being 90°, diffraction information in an equatorial direction can be obtained while with a ψ axis being 0°, diffraction information in a meridian direction can be obtained. Diffraction or scattering observed by a detector meets Bragg's condition. Under the present measurement conditions, for example, a 110 diffraction signal from a PVA crystal detected is a diffraction by (110) plane almost coinciding with a thickness direction of the PVA film. Measurement was conducted under the conditions wherein a ψ was 90° or 0° and an X-ray exposure time was 10 min.

(Data Analysis of WAXD Measurement of a PVA Film)

A two-dimensional image of WAXD obtained was converted into one dimensional profile of an X-ray intensity I(2θ) to 2θ using DIFFRAC.EVA software. A 2θ range was 5° to 38°, and a ψ axis range was −135 to −45°. A sampling step was an interval of 0.02°. The same operation was also applied to background scattering data (data obtained by measurement under the same conditions without a PVA film being laminated).

Analysis of I(2θ) profile was conducted as follows. An I(2θ) profile obtained in background measurement was subtracted from an I(2θ) profile obtained in film measurement. For an I(2θ) profile from which a background scattering was subtracted, as shown in FIG. 1, a baseline connecting an intensity value I(15) at a 2θ position of 15° with an intensity value I(25) at a 2θ position of 25° was drawn, and it was further subtracted from an I(2θ) profile from which a background scattering was subtracted (FIG. 2). The baseline is a linear function passing two points (15,I (15)) and (25,I(25)) in the I(2θ)-2θ coordinate.

A PVA amorphous peak was fit to I(2θ) profile data (FIG. 2) after baseline correction by the following Gaussian function.

$$(x) = a \cdot \exp\left(-\{(x - b)/c\}^2\right)$$

wherein a: peak height, b: peak top position, c: half-value width.

Furthermore, fitting was conducted by least-square method such that a deviation between 2θ=15° to 17.6° and 21° to 21.6° is minimum. Here, a peak top position 2θ of Gaussian function was set to be near (110) plane, that is, 20° (FIG. 3). A peak area of this fitting function is an amorphia amount (A).

Similarly, for peaks in (110) plane and (200) plane of I(2θ) profile data after baseline correction (FIG. 2), fitting was performed using the same function as described above. Here, the peak top of the (110) plane was set to be near 20°, and the peak top of the (200) plane was set to be near 23°. Furthermore, fitting was performed by the least-square method such that a difference between the sum of all Gaussian functions including the Gaussian function of the PVA amorphia obtained above, and the data after baseline correction was minimized (FIG. 4). The peak areas of these Gaussian functions were defined as crystal amounts (B) and (C), respectively.

A value determined by the following equation from the area value of the above amorphia and the crystal is defined as a crystallinity degree.

$$\text{Crystallinity degree (\%)} = \{(B) + (C)\} / \{(A) + (B) + (C)\} \times 100$$

[Calculation of the Amount of Non-Oriented Amorphia and the Amount of Oriented Amorphia in a Polarizing Film] (Wide-Angle X-Ray Diffraction (WAXD) Measurement of a Polarizing Film)

Wide Angle X-ray Diffraction (WAXD) measurements were performed using a D8 Discover from Bruker AXS. An incident X-ray wavelength was 0.154 nm (Cu target). As a detector, VANTEC-500, which is a rare-gas filled micro-gap position-sensitive two-dimensional detector, was used, and a camera distance (a distance between a sample and the detector) was set to approximately 100 mm. For an X-ray generator, a filament current was 1 mA, a voltage was 50 kV, and a collimator diameter was 0.5 mm.

A polarizing film obtained in each Example or Comparative Example was cut into a rectangle with a short side of 5 mm and a long side of 20 mm. Here, the long side direction coincided with the stretching direction of the polarizing film. A plurality of cut polarizing films were stacked and fixed on a sample holder. Here, the polarizing films must be fixed such that a stretching direction of each polarizing film completely coincides. It was confirmed in advance that a signal of the polarizing film was sufficiently stronger than a background scattering and electrical noise of the detector.

A sample holder was mounted to the stage of the X-ray apparatus such that a stretching direction of the polarizing film coincided with an X-axis direction of the D8 Discover.

Here, a normal line to the surface of the polarizing film was made to coincide with the direction of incidence of X-rays. The X-axis, Y-axis, and Z-axis of the apparatus were adjusted such that the X-rays were irradiated onto the polarizing film from the incident direction.

WAXD measurement was conducted under the following conditions. For a sample, an ω axis (an axis which is set such that an angle made with a normal line to the surface of the polarizing film and an X-ray incident direction is ω; generally frequently referred to as "θ axis") was set to 11°, a 2θ axis which is a detector position (an axis which is set such that an angle made with a normal line to the surface of the detector and an incident X-ray direction is 2θ) was set to 22°, and a ψ axis corresponding to rotation within the polarizing film surface was set to 50°. A ψ axis coincides with an azimuth direction in the surface of the polarizing film. Diffraction or scattering observed by a detector meets Bragg's condition. Under the present measurement conditions, for example, a 110 diffraction signal from a PVA crystal detected is a diffraction by (110) plane almost coinciding with a thickness direction of the polarizing film. Measurement was conducted with an X-ray exposure time of 30 min.

(Data Analysis of WAXD Measurement of a Polarizing Film)

A two-dimensional image of WAXD obtained was converted into one dimensional profile of an X-ray intensity I(2θ) to 2θ using DIFFRAC.EVA software. A 2θ range was 5° to 35° and a stretching direction was 0°, and divided I(2θ) profiles were obtained in the azimuth ranges of −5° to 5°, 5° to 15°, 15° to 25°, 25° to 35°, 350 to 45°, 45° to 55°, 55° to 65°, 65° to 75°, 70° to 80°, 75° to 85°, 80° to 90°, 85° to 95°, 90° to 100°, 95° to 105°, 100° to 110° and 105° to 115°. A sampling step was an interval of 0.05°. The same operation was also applied to background scattering data (data obtained by measurement under the same conditions without a polarizing film being laminated).

Analysis of I(2θ) profile was conducted as follows. An I(2θ) profile in the same azimuth range obtained in background measurement was subtracted from an I(2θ) profile obtained in polarizing film measurement. For an I(2θ) profile from which a background scattering was subtracted, as shown in FIG. 5, a baseline connecting an intensity value I(6.5) at a 2θ position of 6.5° with an intensity value I(30.5) at a 2θ position of 30.5° was drawn, and it was further subtracted from an I(2θ) profile from which a background scattering was subtracted. The baseline is a linear function passing two points (6.5,I(6.5)) and (30.5,I(30.5)) in the I(2θ)-2θ coordinate.

FIG. 6 shows the I(2θ) profile after baseline correction. A broad and diffuse scattering component observed over the range of 10° to 30° at 2θ originates mainly from a PVA amorphia. A peak-like component observed over the range of 19° to 21° at 2θ arises from diffraction by the (1-10) and (110) planes of the PVA crystal. Meanwhile, a peak component observed over the range of 21° to 23° at 2θ is known to appear when boric acid is added to PVA, and is believed to be a diffraction signal from a structure formed by interaction of PVA and boric acid. The structure formed by interaction between a PVA and boric acid is called a "PVA-boric acid aggregate structure". That is, the corrected I(2θ) profile obtained by measuring the polarizing film can be separated into three components: "PVA amorphia", "PVA crystal", and "PVA-boric acid aggregate structure". Wave separation analysis was applied to the I(2θ) profile thus corrected.

It was assumed that scattering or diffraction signals from "PVA amorphia", "PVA crystal", and "PVA-boric acid aggregate structure" can be represented by a Gaussian function. Gaussian function A, Gaussian function B, and Gaussian function C were used, respectively. Parameters defining a shape of a Gaussian function were a peak top position x, a peak height h, and a peak width (meaning a standard deviation σ of a normal distribution). All parameters were optimized by least-square fitting using a peak-top position x, a peak height h and a peak width of three Gaussian functions as variable parameters such that a calculated-I(2θ) profile which is the sum of three Gaussian functions representing each component coincides a corrected I(2θ) profile. The results are shown in FIG. 6. In this waveform separation analysis, a calculated-I(2θ) profile must be properly represented by three Gaussian functions such that the profile reflects the structure of the polarizing film without being influenced by variation of measurement data, analysis error and systematic error of fitting. Therefore, in this test, the following constraints (a) to (f) were introduced in the waveform separation analysis.

(a) Since signals in the ranges of 13° to 16° and 25° to 28° at 2θ can be regarded as scattering caused by "PVA amorphia", a corrected I(2θ) profile is reproduced by Gaussian function A alone.

(b) A signal in the range of about 17° to 21° at 2θ is scattering and diffraction caused by "PVA amorphia" and "PVA crystal", and contribution of "PVA crystal" is particularly large. A diffraction peak position due to the crystal is known, and thus the peak top position x of Gaussian function B is fixed.

(c) A Signal in the range of about 20° to 23° at 2θ is scattering and diffraction caused by "PVA amorphia" and "PVA-boric acid aggregate structure". In particular, contribution of the "PVA-boric acid aggregate structure" is large. Therefore, the peak top position x of Gaussian function C is fixed.

(d) Peak widths of Gaussian function B and Gaussian function C are set to the same value in order to properly separate "PVA crystal" and "PVA-boric acid aggregate structure". That is because, no matter what kind of polarizing film is measured, a diffraction intensity at 17° to 21° and 20° to 23° is approximately equal, and there would be not a large difference in a shape between a diffraction peak derived from "PVA crystal" and a diffraction peak derived from "PVA-boric acid aggregate structure".

(e) Based on the above (a) to (d), optimal values of a peak-top position x and a peak width a of each of three Gaussian functions were searched, in which a calculated-I (2θ) profile as the sum of three Gaussian functions satisfactorily represents all corrected I(2θ) profiles.

(f) For all corrected I(2θ) profiles, least-square fitting was performed using only peak heights of three Gaussian functions. A fitting range was 6.5° to 30.5°.

In the I(2θ) profile in an equatorial direction, that is, at an azimuth angle of about 90°, a 100 diffraction peak derived from the PVA crystal oriented in a stretching direction is observed at about 11° at the 2θ position. When a 100 diffraction peak was observed, it was regarded that the diffraction peak shape could be represented by a Gaussian function, and it was included in the waveform separation analysis for the I(2θ) profile. That is, a peak-top position x, a peak height h, and a peak width a of the Gaussian function were appropriately adjusted, and least square fitting was performed.

After least-squares fitting, the areas of the three Gaussian functions were calculated and assumed to be integrated intensity values (A) of the signals derived from "PVA amorphia", "PVA crystal" and "PVA-boric acid aggregate structure", respectively. When a 100 diffraction peak was observed, an integrated intensity value of the 100 diffraction peak was included in the "PVA crystal". The above waveform separation analysis was performed on all corrected I (2θ) profiles for each azimuth angle, and integrated intensity values (A) of "PVA amorphia", "PVA crystal", "PVA-boric acid aggregate structure", respectively, were calculated. Here, for these analyses, Microsoft's Excel software was used.

FIG. 7 is a plot of integrated intensity values (A) of "PVA amorphia", "PVA crystal", and "PVA-boric acid aggregate structure" obtained by the waveform separation analysis against an azimuth. Here, an azimuth was defined as follows. For example, the analysis results for a corrected I(2θ) profile in the range of −5° to 5° azimuth were plotted against an azimuth 0°, and the analysis results for a corrected I(2θ) profile in the range of 85° to 95° azimuth were plotted against an azimuth 90°.

An azimuth dispersion plot A(φ) of an integrated intensity value of each component reflects an orientation state of each component to a stretching direction of the polarizing film. Assuming that scattering or diffraction signals observed in the analyzed 2θ range are primarily due to interference between PVA chains, proportions of signals observed at azimuth of 90° are approximately equal to proportions of components in which PVA molecular chains are aligned in a stretching direction. A proportion of a signal observed at an azimuth of 0° is approximately equal to a proportion of a component in which the PVA molecular chains are aligned in the direction vertical to a stretching direction. That is, FIG. 7 is approximately equal to a distribution function f(φ) of the orientation state of each component. When the PVA is completely non-oriented, a distribution function is not dependent on an azimuth. Meanwhile, when the PVA is oriented with a certain distribution in a stretching direction, a distribution function shows a peak shape with the maximum intensity at 90°.

Thus, an azimuth distribution plot A(φ) of an integrated intensity was separated into a distribution function f1(φ) of oriented components and a distribution function f2(φ) of non-oriented components. Since a distribution function of the non-oriented component is not dependent on an azimuth, f2(φ)=C (C is a constant). As shown in FIG. 8, f2(φ) is a component having a certain constant C at any azimuth, and f1(φ) is a component having a probability distribution at a particular azimuth. It has been found that for any polarizing film, data processing should be performed with the following procedure in order to accurately obtain f1(φ) from an azimuthal dispersion plot A(φ). Assuming that a distribution function f1(φ) of the oriented component of "PVA crystal" and "PVA-boric acid aggregate structure" can be represented by a Lorentz function, a peak-top position was set to 90°, and a peak height h and a peak half-value width were variable parameters. Assuming that a distribution function f1 (φ) of the oriented component of "PVA amorphia" can be represented by a linear sum of two Gaussian functions, a peak-top position was set to 90°, and a peak height h and a peak half-value width were variable parameters. Least-square fitting was performed such that the sum of f1(φ) and f2(φ) satisfactorily reproduces A(φ), to obtain optimal solutions of a constant C, a peak height h and a peak half-value width. The fitting was performed in the range of an azimuth range of 0° to 180°.

Here, of the distribution function f1(φ) of the oriented component obtained by the above fitting, a proportion of the highly oriented component with an azimuth φ in the range of 80° to 1000 was determined as follows. First, in the azimuth range of 0° to 180°, an integrated value of the distribution function f1(φ) of the oriented component was determined, and was designated as F1. Next, an integrated value of the distribution function f1(φ) of the oriented component in the range of the azimuth p of 80° to 100° was calculated and was designated as F1a. F1-F1a was an integrated value of 0° to 800 and of 100° to 180°, which was designated as F1b. Fib is an oriented component with a small orientation degree. An integrated value F2 of the distribution function f2(φ) of the non-oriented component was calculated in the azimuth range of 0° to 180°. Values of F1a, Fib, and F2 were obtained for "PVA amorphia," "PVA crystal," and "PVA-boric acid aggregate structure," respectively. F1a, Fib and F2 are values proportional to a high-oriented component, a low-oriented component and a non-oriented component, respectively.

Existence rates of the high-oriented component, the low-oriented component, and the non-oriented component of each of the "PVA amorphia", "PVA crystal", and "PVA-boric acid aggregate structure", that is, the nine components, were regarded as proportions of the components to the sum of integrated values of the components as the following equation. These are designated as F1a-PVA amorphia, F1b-PVA amorphia, F2-PVA amorphia, F1a-PVA crystal, F1b-PVA crystal, F2-PVA crystal, F1a-PVA-boric acid aggregate structure, F1b-PVA-boric acid aggregate structure, and F2-PVA-boric acid aggregate structure.

Of these, the non-oriented component F2-PVA amorphia of "PVA amorphia" is the above-mentioned non-oriented amorphia, and the sum of the high-oriented component F1a-PVA crystal of "PVA crystal" and the low-oriented component of "PVA crystal" is the oriented crystal already mentioned.

[Calculation of a Boric Acid Content (% by Mass) in a Polarizing Film]

After the polarizing film obtained in each Example or Comparative Example was humidity-conditioned at a temperature of 23° C. and a humidity of 50% RH for 16 hours, about 1 mg of a sample was collected and its mass (J (g)) was Measured. Next, the Collected Sample was Dissolved in 20 mL of distilled water to give an aqueous solution. This aqueous solution was used as a measurement sample, and its mass (K (g)) was measured. Subsequently, a boron concentration (L (ppm)) of the measurement sample was measured using a multi-type ICP emission spectrometer (ICPE-9000) from Shimadzu Corporation. Then, the value calculated by substituting the value into the following formula was taken as a boric acid content (% by mass) in the polarizing film.

Boric acid content in the polarizing film $$(\% \text{ by mass}) = \left[\left(L \times 10^{-6} \times K\right)/J\right] \times 100/(10.8/61.8)$$

[Evaluation of Maximum Elongation of a Thermoformed Article]

For the thermoformed body obtained in each Example or Comparative Example, when the thermoformed body was cut on a plane vertical to the surface of the film before thermoforming such that an arc length of the section was maximized, the arc length was designated as A, and an elongation rate of A to a diameter of the mold was defined as the maximum elongation coefficient (%) (FIG. 9).

Maximum elongation coefficient (%) =

(Length of maximum arc length (A)/Diameter of a mold)×100

[Evaluation of a Crack Rate]

When the polarizing plate obtained in each Example or Comparative Example was thermoformed using a mold which had a spherical concave having a curvature radius of 5.8 cm and a depth of 2.8 cm, a proportion of the samples in which one or more cracks occurred of the total samples was calculated.

Crack rate (%) =

(Number of samples with cracks/total number of samples)×100

[Evaluation of Polarization Performance of a Thermoformed Product]

From the thinnest part of the thermoformed body obtained in each Example or Comparative Example, a rectangular film piece with the dimension of 3 cm in a length direction and 1.5 cm in a width direction of the polarizing plate before thermoforming was taken. Using a spectrophotometer with an integrating sphere ("V7100" from JASCO Corporation), a polarization degree and a single body transmittance of the film piece at a wavelength of 650 nm were determined.

Example 1

An aqueous solution containing 100 parts by mass of a PVA (a saponified product of a vinyl acetate homopolymer, polymerization degree: 2,300, saponification degree: 99.3 mol %), 10 parts by mass of glycerin as a plasticizer, and 0.1 parts by mass of sodium polyoxyethylene lauryl ether sulfate as a surfactant, with a content of the PVA being 9% by mass, was used as a film-deposition stock liquid. The solution was dried on a metal roll at 40° C., and a film obtained was heated at 110° C. for 10 minutes in a hot air dryer to produce a PVA film with a thickness of 30 μm. The PVA film obtained had a crystallinity degree of 28%, which was calculated by the method described above.

A sample of 40 cm width×15 cm length was cut from the central portion of the obtained PVA film in the width direction such that a range of 40 cm width×10 cm length could be uniaxially stretched. This sample was immersed in water at a liquid temperature of 48° C. for 2 minutes while being uniaxially swelled in the longitudinal direction to 1.3 times as long as its original length (first-stage stretching) (swelling treatment). Then, the sample was immersed in a Direct Blue 15 solution (dyeing bath: Direct Blue 15 concentration of 0.013% by mass, sodium sulfate concentration of 0.42% by mass, sodium tripolyphosphate concentration of 0.42% by mass) at a liquid temperature of 48° C. for 5 minutes while being dyed (dyeing treatment) and being uniaxially stretched (second-stage stretching) in the length direction by 1.8 times (total 2.4 times). Next, while being immersed in an aqueous boric acid solution (crosslinking bath: boric acid concentration of 2.0% by mass) at a liquid temperature of 40° C. for 1 minute, the sample was uniaxially stretched by 1.1 times (total 2.7 times) in the length direction and being crosslinked (third-stage stretching) (crosslinking). Subsequently, while being immersed in an aqueous boric acid solution (stretching bath: boric acid concentration of 3.9% by mass) at a liquid temperature of 58° C., the sample is uniaxially stretched by 1.5 times (4.0 times in total) in the length direction (fourth-stage stretching) (stretching).

Subsequently, the sample was washed by immersing it in water at a liquid temperature of 30° C. for 1 second without stretching (washing). Subsequently, both ends were fixed so as not to cause dimensional change in the length direction, and the film was dried in a dryer at 70° C. for 3 minutes (drying) to give a polarizing film. For the polarizing film obtained, a boric acid content was calculated by the method described above and found to be 11% by mass. Furthermore, for the polarizing film obtained, a thickness was measured, and a non-oriented amorphia content and an oriented crystal content were determined by the above-described method. The results are shown in Table 1.

The polarizing film obtained was cut from the central portion in the width direction into a piece with a size of 25 cm in width×25 cm in length. Acrylic films cut into a size of 25 cm×25 cm (H15000, from Kuraray Co., Ltd., thickness: 75 μm) on one side of which an adhesive (MPD62, from MeCan Imaging Inc., thickness: 25 μm) cut into a size of 25 cm×25 cm was laminated were laminated and bonded on both sides of the cut polarizing film, to prepare a polarizing plate with a size of 25 cm in width×25 cm in length.

The polarizing plate obtained was set in a jig of a vacuum pressure molding machine (FVT-400) from Wakisaka Engineering Co., Ltd. The polarizing plate obtained was heated with a heater set at 250° C. for 12 seconds, and was heating-vacuum-molded for 5 seconds using a mold which had a spherical concave having a curvature radius of 5.8 cm and a depth of 2.8 cm, to give a thermoformed article with a maximum elongation coefficient of 20%. After molding, the thermoformed article held on the jig was cooled for 5 seconds, and the article was removed from the jig to give a thermoformed article. For the thermoformed body obtained, a crack rate, a polarization degree, and a single body transmittance were calculated by the methods described above. The results are shown in Table 1.

Example 2

A PVA film, a polarizing film, a polarizing plate, and a thermoformed article were produced as described in Example 1, except that the amount of glycerol in a film-deposition stock liquid was 0 part by mass, a metal roll temperature during film deposition was 80° C. and a stretch ratio in stretching was 1.9 times (total 5.0 times). For the PVA film obtained, a crystallinity degree was calculated as described above, and found to be 31%. For the polarizing film obtained, a boric acid content was calculated as described above, and found to be 9% by mass. Furthermore, for the polarizing film obtained, a thickness was measured, and the amounts of a non-oriented amorphia and of an oriented crystal were determined. The results are shown in Table 1. Furthermore, for the thermoformed article obtained, a crack rate, a polarization degree and a single body transmittance were calculated as described above. The results are shown in Table 1.

Example 3

A PVA film, a polarizing film, a polarizing plate, and a thermoformed article were produced as described in Example 1, except that the amount of glycerol in a film-deposition stock liquid was 0 part by mass and a stretch ratio in stretching was 1.9 times (total 5.0 times). For the PVA film obtained, a crystallinity degree was calculated as described above, and found to be 26%. For the polarizing film obtained, a boric acid content was calculated as described above, and found to be 10% by mass. Furthermore, for the polarizing film obtained, a thickness was measured, and the amounts of a non-oriented amorphia and of an oriented crystal were determined. The results are shown in Table 1. Furthermore, for the thermoformed article obtained, a crack rate, a polarization degree and a single body transmittance were calculated as described above. The results are shown in Table 1.

Comparative Example 1

A PVA film, a polarizing film, a polarizing plate, and a thermoformed article were produced as described in Example 2, except that the amount of glycerol in a film-deposition stock liquid was 10 parts by mass. For the PVA film obtained, a crystallinity degree was calculated as described above, and found to be 32%. For the polarizing film obtained, a boric acid content was calculated as described above, and found to be 9% by mass. Furthermore, for the polarizing film obtained, a thickness was measured, and the amounts of a non-oriented amorphia and of an oriented crystal were determined. The results are shown in Table 1. Furthermore, for the thermoformed article obtained, a crack rate, a polarization degree and a single body transmittance were calculated as described above. The results are shown in Table 1.

Comparative Example 2

A polarizing film, a polarizing plate, and a thermoformed article were produced as described in Example 3, except that a stretch ratio in stretching was 2.4 times (total 6.5 times). For the polarizing film obtained, a boric acid content was calculated as described above, and found to be 10% by mass. Furthermore, for the polarizing film obtained, a thickness was measured, and the amounts of a non-oriented amorphia and of an oriented crystal were determined. The results are shown in Table 1. Furthermore, for the thermoformed article obtained, a crack rate, a polarization degree and a single body transmittance were calculated as described above. The results are shown in Table 1.

TABLE 1

| | Production method | | | Polarizing film | | | Thermoformed article | | |
| | Glycerol amount parts by mass | Total stretch ratio times | Roll temperature ° C. | Thickness μm | Non-oriented amorphia amount % | Oriented crystal amount % | Maximum elongation coefficient % | Crack rate % | Polarization degree % | Single body transmittance % |
|---|---|---|---|---|---|---|---|---|---|---|
| Example 1 | 10 | 4 | 40 | 13 | 63 | 12 | 20 | 0 | 85 | 30 |
| Example 2 | 0 | 5 | 80 | 8 | 56 | 15 | 20 | 30 | 90 | 33 |

TABLE 1-continued

| | Production method | | | Polarizing film | | | Thermoformed article | | | |
|---|---|---|---|---|---|---|---|---|---|---|
| | Glycerol | | | | Non- | | | | | |
| | amount parts by mass | Total stretch ratio times | Roll temperature ° C. | Thick-ness μm | oriented amorphia amount % | Oriented crystal amount % | Maximum elongation coefficient % | Crack rate % | Polarization degree % | Single body transmittance % |
| Example 3 | 0 | 5 | 40 | 8 | 61 | 11 | 20 | 10 | 93 | 30 |
| Comparative Example 1 | 10 | 5 | 80 | 8 | 52 | 16 | 20 | 70 | 93 | 35 |
| Comparative Example 2 | 0 | 6.5 | 40 | 6 | 53 | 16 | 20 | 50 | 95 | 33 |

The invention claimed is:

1. A polarizing plate comprising a polarizing film with a thickness of 20 μm or less, wherein the amount of a non-oriented amorphous part in the polarizing film is 55% or more and 70% or less.

2. The polarizing plate according to claim 1, wherein the amount of an oriented crystalline part in the polarizing film is 10% or more and 15% or less.

3. A thermoformed article formed by thermoforming the polarizing plate according to claim 1.

4. The thermoformed article according to claim 3, having a maximum elongation coefficient of 35% or less.

5. The thermoformed article according to claim 3, wherein a crack rate is 0 to 40% when thermoforming is conducted using a mold which has a spherical concave having a curvature radius of 5.8 cm and a depth of 2.8 cm.

6. The thermoformed article according to claim 3, wherein a polarization degree is 80% or more and 99.7% or less.

7. The thermoformed article according to claim 3, wherein a single body transmittance is 20% or more and 40% or less.

8. A method for producing a thermoformed article comprising thermoforming the polarizing plate according to claim 1.

9. A thermoformed article formed by thermoforming the polarizing plate according to claim 2.

10. The thermoformed article according to claim 9, having a maximum elongation coefficient of 35% or less.

11. The thermoformed article according to claim 9, wherein a crack rate is 0% or more and 40% or less when thermoforming is conducted using a mold which has a spherical concave having a curvature radius of 5.8 cm and a depth of 2.8 cm.

12. The thermoformed article according to claim 9, wherein a polarization degree is 80% or more and 99.7% or less.

13. The thermoformed article according to claim 9, wherein a single body transmittance is 20% or more and 40% or less.

14. A method for producing a thermoformed article comprising thermoforming the polarizing plate according to claim 2.

15. The polarizing plate comprising a polarizing film according to claim 1, wherein the amount of a non-oriented amorphous part in the polarizing film is 56% or more and 69% or less.

16. The polarizing plate comprising a polarizing film according to claim 1, wherein the amount of a non-oriented amorphous part in the polarizing film is 57% or more and 68% or less.

17. The polarizing plate comprising a polarizing film according to claim 1, wherein the thickness of the film is 17 μm or less.

18. The polarizing plate comprising a polarizing film according to claim 1, wherein the thickness of the film is 14 μm or less.

19. The polarizing plate comprising a polarizing film according to claim 1, wherein the thickness of the film is 12 μm or less.

20. The polarizing plate comprising a polarizing film according to claim 1, wherein the thickness of the film is 5 μm or more.

* * * * *